March 24, 1970  KOSUKE MATSUKATA  3,502,165
GAS-ELECTRIC DRIVEN VEHICLE WITH RETRACTABLE WHEELS
Filed March 9, 1967  2 Sheets-Sheet 2

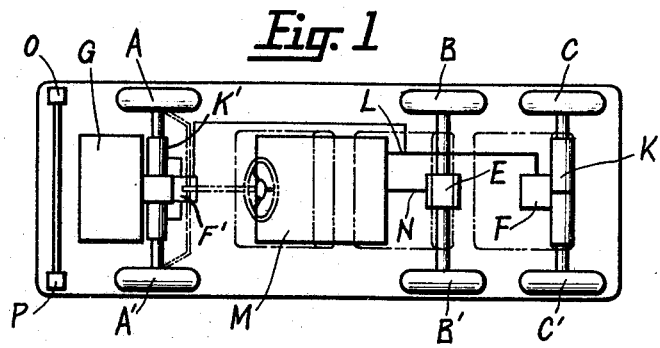
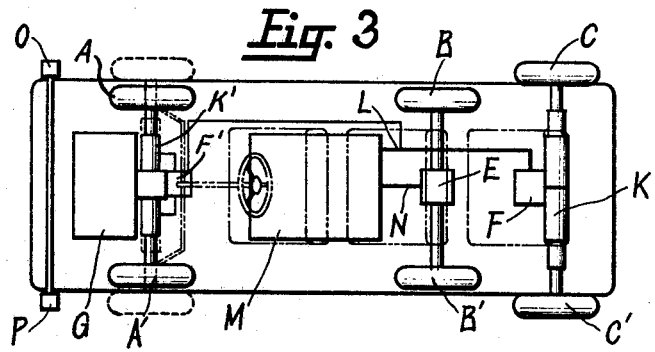
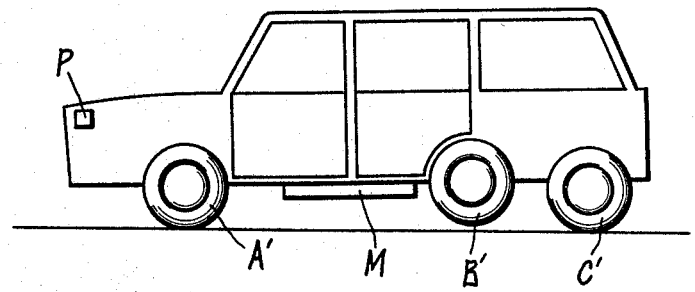
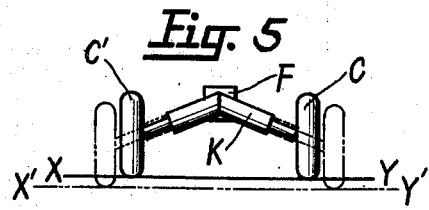

KOSUKE MATSUKATA
INVENTOR

BY Wenderoth, Lind & Ponack
ATTORNEYS

United States Patent Office 3,502,165
Patented Mar. 24, 1970

3,502,165
GAS-ELECTRIC DRIVEN VEHICLE WITH RETRACTABLE WHEELS
Kosuke Matsukata, 390 Tsurumi-cho, Tsurumi-ku, Yokohama, Japan
Filed Mar. 9, 1967, Ser. No. 621,958
Claims priority, application Japan, Jan. 16, 1967, 42/2,872
Int. Cl. B62d 3/00, 9/00; B60k 1/00
U.S. Cl. 180—23       9 Claims

ABSTRACT OF THE DISCLOSURE

An automobile having an elongated body, preferably adapted to seat three persons one behind the other, and having a gasoline motor driven pair of front wheels, and two pairs of wheels of the rear, one pair being electric motor driven and the other pair being extendable downwardly and outwardly from a raised position so as to raise the rear end of the vehicle off said one pair of wheels. When it is necessary to run the vehicle in a zone where air pollution is strictly controlled, the said other pair of wheels is raised and the said one pair of wheels act as the drive wheels, being driven by the electric motor. When the vehicle is run in a zone where there is no control, the said other pair of wheels is extended and the said one pair raised off the ground, and the front wheels are driven by the gasoline motor driven wheels.

BACKGROUND OF THE INVENTION

Field of the invention

The present invention relates to a vehicle, such as a passenger car, which can be driven either by a gasoline motor when it is desired to drive it at a relatively high rate of speed in a zone where air pollution by internal combustion engines is uncontrolled, and which can be driven by an electric motor at a somewhat reduced rate of speed in a zone where air pollution is strictly controlled.

Description of prior art

The recent increase in the number of automobiles in the metropolitan areas has caused traffic confusion, and this problem has been attacked by various authorities concerned. In addition to the problem of traffic confusion, traffic authorities are now faced with the pollution of air from exhausted gas from gasoline engines driving the automobiles.

One solution of the problem of traffic confusion put forward has been the use of a six wheel city car invented by this inventor (Japanese Patent No. 460,510 and French Patent No. 1,368,804). However, this is only related to the solution of congestion of city traffic. The polluted air problem must be solved by other means.

In the not too distant future, severe controls of air pollution in the busy center of each metropolitan area must be anticipated. When such time comes, the electric automobile may be one of those vehicles which can meet the requirements of such controls.

In many quarters, in this connection, various types of research and experiments are being carried out. Contrivances using atomic energy may be successfully used at some future time. However, an electric motor using an electric cell or battery is the most popular research objective at this time. The highest speed achieved with an electric car is reported to be 70 kilometers per hour, which speed may be sufficient for a city's congested area, while at least a maximum of 120 kilometers per hour may be reasonably demanded for a car used in a suburban district from which a good portion of the city population has to commute daily in their own cars.

For such a car, consideration must be given to its size, weight, wheelbase, track, and its center of gravity. As an aid to the solution of traffic congestion, the space occupied on a public road by such a car must be reduced to a minimum, while the comfort of the occupants of such a car cannot be sacrificed. Weight must be cut to a minimum so that the power of the battery operating the electric motor can be limited to avoid the necessity of an excessive number of batteries.

SUMMARY OF THE INVENTION

It is an object of the present invention to provide a car which will be able to run on electric power when only relatively moderate speeds are required and strict control of air pollution is required, and which will be able to run on a gasoline powered engine when high speed is desired and air pollution is not a consideration.

It is a further object of the invention to provide a car which is relatively small and narrow so as to reduce traffic congestion, and so as to make it feasible to drive it by battery supplied electric power.

To meet these requirements, a maximum of three occupants, including the driver is considered most desirable. The three persons should be seated one after the other in a line so that at least 30% of the track width of a car in which two can be seated abreast can be saved. Thus, three lanes of traffic can be provided on a road where previously room on the road was sufficient only for two lanes of traffic. This improves the speed of traffic on the road, contributing greatly to constructive solutions of the traffic problem. On the other hand, dynamic stability is affected by the three-in-line seat arrangement. This problem is taken care of efficiently by having a gasoline engine driving the front wheels and an electric battery operated motor driving middle wheels, and rearmost wheels are provided near the tail end. The rearmost wheels are on a pair of inclined extendable axles and can be extended outwardly and downwardly.

In addition, the electric batteries for driving the electric motor are placed underneath the chassis to lower the center of gravity of the car.

BRIEF DESCRIPTION OF THE DRAWINGS

The invention will now be described in connection with the accompanying drawings, in which:

FIG. 1 is a bottom plan view of a vehicle according to the invention in which the wheels are positioned for driving the vehicle at low speed on electric power;

FIG. 3 is a bottom plan view of the vehicle of FIG. 1 with the wheels positioned for driving the vehicle at high speed on the gasoline powered motor;

FIG. 4 is a side elevation view of the vehicle with the wheels in the position as in FIG. 3;

FIG. 5 is a rear elevation view of the extendable axles showing them in the extended position in dotted lines;

DESCRIPTION OF A PREFERRED EMBODIMENT

In FIGURE 1, the vehicle has front wheels A and A' driven by an internal combustion engine G mounted on the chassis. Also provided are middle wheels B and B' driven by an electric motor or motors E by electric current through a conductor N from cells or batteries M. Rearmost wheels C and C' are also provided and are positioned at the ends of extendable axles K which are operated by an oil pressure pump or gear driven by motor F energized by current through a conductor L from batteries M. Front lights O and P are mounted on the vehicle so that they can be outwardly extended on opposite sides of hood, so that when the rearmost wheels C and C' are extended, the lamps will be positioned at the outermost position as shown in FIG. 3. This will tell both the car driver and drivers of other cars the status of the track and wheel base at any instant.

The means for extending the lamps are not shown, but can be extendable axles or rods similar to the axles for the rearmost wheels C and C', and can be driven by a similar motor or pump connected by a conductor to the battery M.

Further, if necessary, front wheels can be positioned at the ends of extendable axles K' so as to be horizontally outwardly extendable, the extendable axles K' being connected to a pump or gear driven by motor F', the extension being carried out at the same time as the horizontal displacement of the rearmost wheels, so that track width of the front wheels can be made the same as that of the rearmost wheels thus preventing the latter from hitting any obstacle which the front wheels might pass close to if they were not extended.

Figure 2:
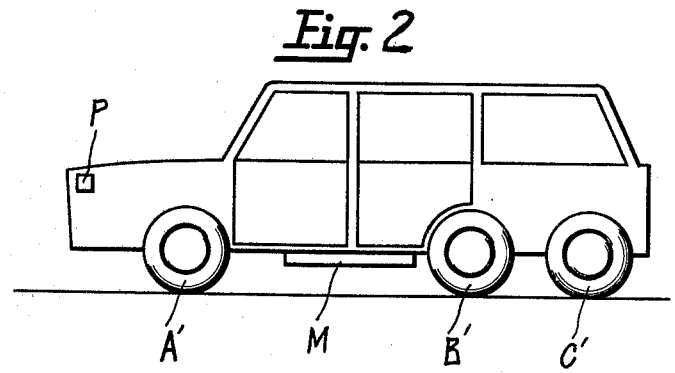
FIG. 2 is a side elevation view of the vehicle of FIG. 1.

When the car is used in exhaust gas control districts, the middle wheels B and B' are driven by the electric motor E energized by batteries M underneath the chassis and the gasoline engine is not operated. When the car is driven by the middle wheels B and B', the rearmost wheels C and C' are generally in contact with the ground, as shown in FIGS. 1 and 2. A speed of 70 km./hour can be safely achieved by an electric car because the low weight of the car allowing only three occupants seated one after the other in a line, permits such a speed even with electric propulsion. Effective abrupt stopping of the car can be achieved by providing an additional independent brake system for the rearmost wheels C and C' when the rearmost wheels remain on the ground.

Outside the exhaust gas control district, the internal combustion engine G is operated and drives the front wheels A and A'. The rearmost wheels C and C' are now extended outwardly and downwardly by the inclined telescopic axles to the position shown in FIGS. 3 and 4. These are operated by an oil pressure pump or gear coupled with the electric motor F which is energized by current flowing through conductors from batteries M and in the extended position raise the middle wheels B and B' from the ground. The result of those operations is that the wheel base AC and A'C' of car is made longer and the track CC' at the rearmost wheels becomes wider than before, thus allowing the speed to be raised to 120 km./hour without reducing the stability of the car such as during cornering.

As seen in FIG. 5, the initial ground level XY for the wheels in the retracted position is lowered to level X'Y' when the axles are extended and lowered. This shows how the rear part of the car is raised and the middle wheels B and B' are raised from the ground when the axles are extended outwardly and downwardly.

Figure 6:
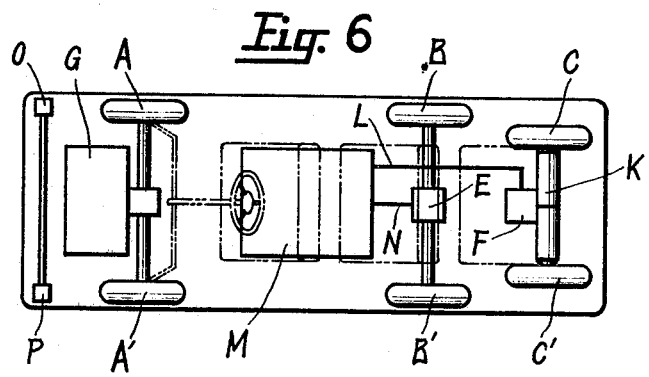
FIG. 6 is a bottom plan view of another embodiment of the vehicle according to the invention with the wheels in position for driving the vehicle at a relatively low speed.
Figure 7:
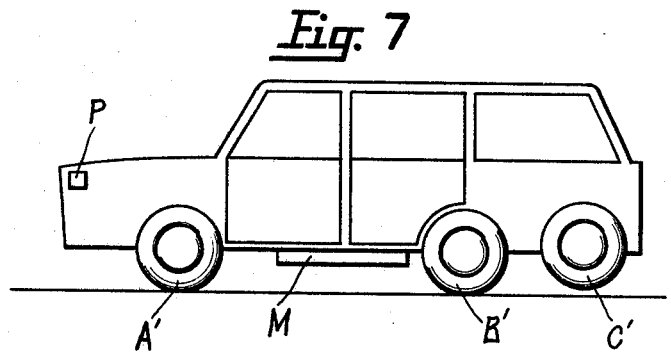
FIG. 7 is a side elevation view of the vehicle of FIG. 6.

If it is desired to shorten the wheel base in order to permit the car to turn sharper corners, the rearmost wheels C and C' can be withdrawn further, as shown in FIGS. 6 and 7, in which case the wheels are lifted from the ground and drawn inwardly inside the track of the wheels A and A' and B and B'. The wheel base is now much shorter, shortening the turning radius and facilitating turning in narrow or winding streets or during parking.

The construction of the vehicle according to the invention enables this somewhat lengthy body to be driven either on six wheels or on four wheels as required. For example, when the car must run at high speed, it can retain full stability on four wheels with a long wheel base and a wide track by having the front driving wheels and rearmost wheels extended and lowered without the middle wheels touching the ground.

On the other hand, when it is used on a congested city road, it can run on six wheels with the electrically driven motor in driving the axle of the middle wheels while the rearmost wheels touch the ground, so that the rear wheels can be for an additional independent braking system. If this brake system, however, is unnecessary, the car can run on four wheels on a short wheel base by drawing in the rearmost wheels. The shorter wheelbased car thus may be useful for negotiating narrow city roads and sharp corners in an old city or parking in small parking spaces.

Thus this invention solves two problems of traffic congestion as well as prevention of unsanitary pollution due to the exhaust gas of a motor car in a big metropolis, and commuters who commute from suburban districts to the center of a metropolis and those who live in the central area and spend their weekend in their second houses in the country can both utilize the vehicle according to this invention.

What is claimed is:

1. A vehicle having a chassis, a pair of front wheels on said chassis, a gasoline engine on the front of said chassis and disengageably coupled to said front wheels for driving them, at least two pairs of rear wheels on said chassis, an electric motor on said chassis disengageably coupled to one pair of said rear wheels for driving them, a battery on said chassis coupled to said electric motor, and extendable axles on which the other pair of said rear wheels are mounted, said axles being extendable outwardly and downwardly of said vehicle chassis to extend the wheels thereon from a level at least at the level of said one pair of rear wheels to a level below the level of said one pair of rear wheels, whereby when the said extendable axles are extended they raise the rear of said chassis to raise said one pair of rear wheels from the ground.

2. A vehicle as claimed in claim 1 in which said axles are extendable to extend the wheels thereon from a level above the level of said one pair of wheels, whereby said other pair of wheels can be retracted out of contact with the ground.

3. A vehicle as claimed in claim 1 in which the rearmost wheels of said at least two pairs of wheels are the wheels on the extendable axles.

4. A vehicle as claimed in claim 1 in which said front wheels are mounted on axles which are extendable horizontally, whereby said front wheels can be extended laterally of said chassis the same distance as said wheels on the extendable axles.

5. A vehicle as claimed in claim 1 adaptable to seat three occupants one behind the other in a line.

6. A vehicle as claimed in claim 1 adaptable to seat occupants in conventional way.

7. A vehicle having a chassis, a pair of front wheels on said chassis, a gasoline engine on the front of said chassis and disengageably coupled to said front wheels for driving them, at least two pairs of rear wheels on said chassis, an electric motor on said chassis disengageably coupled to one pair of said rear wheels for driving them, a battery on said chassis coupled to said electric motor, and retractable axles on which the other pair of said rear wheels are mounted, said axles being retracted inwardly and upwardly of said vehicle chassis to retract the wheels thereon from a level at least at the level of said one pair of rear wheels to a level above the level of said one pair of rear wheels, whereby when the said retractable axles are retracted, vehicle runs on a pair of front wheels and the other pair of said rear wheels.

8. A vehicle as claimed in claim 7 adaptable to seat three occupants one behind the other in a line.

9. A vehicle as claimed in claim 7 adaptable to seat occupants in conventional way.

References Cited

UNITED STATES PATENTS 937,859  10/1909  Pieper.
2,659,446  11/1953  Willock.
3,352,373  11/1967  Tuck.

A. HARRY LEVY, Primary Examiner

U.S. Cl. X.R.

180—44, 65